United States Patent [19]

Bringuier

[11] Patent Number: 5,509,630
[45] Date of Patent: Apr. 23, 1996

[54] MOTOR VEHICLE FOR THE SHOOTING OF A FILM IN DIFFICULT AND HILLY GROUND

[76] Inventor: Jean-Marc Bringuier, 6 rue, Lalande, 75014 Paris, France

[21] Appl. No.: 133,078
[22] PCT Filed: Feb. 11, 1993
[86] PCT No.: PCT/EP93/00143
 § 371 Date: Oct. 12, 1993
 § 102(e) Date: Oct. 12, 1993
[87] PCT Pub. No.: WO93/16322
 PCT Pub. Date: Aug. 19, 1993

[30] Foreign Application Priority Data

Feb. 14, 1992 [FR] France ..................... 92 01714

[51] Int. Cl.⁶ ..................... F16M 11/00
[52] U.S. Cl. ..................... 248/178.1; 182/63
[58] Field of Search ..................... 182/2, 142, 63; 248/129, 178.1; 280/200

[56] References Cited

U.S. PATENT DOCUMENTS 2,447,667  8/1948  Raby .
3,334,848  8/1967  Iwai .
4,375,840  3/1983  Campbell ..................... 182/2

FOREIGN PATENT DOCUMENTS 1209437  3/1960  France .
2356872  1/1978  France .
2640206  6/1990  France .
2021800  12/1979  United Kingdom .

*Primary Examiner*—Alvin C. Chin-Shue
*Attorney, Agent, or Firm*—Remy J. VanOphem; John VanOphem

[57] ABSTRACT

Motor vehicle of the type currently called "off-road" vehicle capable of receiving a cameraman, a shooting device support and a shooting device, and providing for the support of a movable assembly constituted by the cameraman, shooting device support, and shooting device independently of the inclination of its chassis. The movable assembly is also designed to allow for camera-lift and pivoting movements controlled by the cameraman.

27 Claims, 11 Drawing Sheets

MOTOR VEHICLE FOR THE SHOOTING OF A FILM IN DIFFICULT AND HILLY GROUND

BACKGROUND OF THE INVENTION

1. Field of the Invention

The present invention concerns an "all terrain" motor vehicle adapted to receive a shooting device and to move the latter vertically.

2. Description of the Prior Art

Shooting which entails displacement of a camera over the ground and its elevation on a vertical axis is conventionally effected by means of the following devices:

The first device is a dolly adapted to roll on substantially horizontal rails or on a substantially flat, smooth and hard surface. The dolly may be fitted with an articulated lifting arm adapted to support a camera, a conventional tilt and pan control device and one or two operators This method achieves good stability and good camera horizontality. It entails installing a considerable amount of equipment, however, prevents any unplanned alteration or extension of the shooting route and restricts framing because the rails or boards used to correct irregularities in the terrain may enter shots. These restrictions also apply to conventional or remote-controlled cranes although their capabilities in terms of translation and rotation about three axes are better than those of the aforementioned means.

The second device has a camera, its operators and a conventional or remote-controlled camera tilt and pan device together with a conventional lifting arm mounted on a conventional type automobile vehicle, with the superstructure removed so that it does not impede shooting, usually having a very soft conventional suspension, a large chassis and wide, under-inflated tires. A device of this kind has a more extensive range of speed than a dolly but is less maneuverable and is larger in overall size. The device is unusable except on metaled road surfaces for which the vehicle was designed: vibration and impact jolt the lens, the horizontal references of the camera are severely disturbed and the vehicle cannot drive over obstacles or abrupt changes in level at each wheel without the risk of overturning.

A third known device combines a vehicle, a conventional crane and gyroscopic camera or lens stabilizers which stabilize gyroscopically the optical path of the image. This latter technique tends to restrict panning and tilting of the camera. It is ill-suited to attenuating unwanted translatory movements and movements of the rotation axis of the camera lens. The implementation of this type of device on an all terrain vehicle results in considerable installation costs.

Another conventional device includes various camera stabilizing means allowing some movement in elevation and adapted to be carried by the operator wearing a harness and moving on foot or travelling on a vehicle (case 1) or harnessed directly to a vehicle (case 2). The most comprehensive form of such devices is described in French Patent 7,719,662. They constitute mobile and translatory devices and are subject to certain geometrical criteria which limit displacement of the camera on the vertical axis in particular to their own amplitude of movement in translation. In case 1, shooting is physically tiring for the operator (so limiting his productivity) and dangerous because in difficult and hilly terrain he has only his own muscles and sense of balance to compensate for his own instability. In this case any harnessing and bracing of the operator who is already wearing a harness tends to impede his ability to correct his own posture and to restrict the angles at which he can shoot. In case 2 the capacity of the shock absorbing means is seriously compromised if the vehicle is inclined to one side, drives up or down an incline or makes a tight turn, as to operate correctly they require a stable anchor point which is not possible with rigid attachment to a superstructure of the vehicle or any other support rigidly attached to the chassis. In all situations in which the horizontality of the moving vehicle is compromised, the operator must make violent compensatory movements using the muscles of the arms and shoulders to counteract sudden translatory movements of the floating part of the device whose anchor point is subject to angular deviations which are amplified proportionally to those of the chassis. The stabilizing means may even break if their masses are no longer controlled by the operator who also has to maintain his own stability.

The applicant has already made an invention whereby some of these problems may be overcome and this is the subject of a patent issued Jan. 31, 1992, as French Patent Number 8,816,196. This patent describes a device for moving a shooting device and the personnel needed to operate it over ground that is traditionally inaccessible to conventional equipment while offering, even at very low speeds, a stability and maintenance of the horizontal level of the device independently of the terrain over which the vehicle moves. The drawback of a device of this kind in accordance with the '196 patent of the applicant is its high manufacturing cost given the complexity of its industrial manufacture.

SUMMARY OF THE INVENTION

An object of the present invention is to provide a device offering functions substantially equivalent to those of the earlier invention of the applicant at a much reduced manufacturing cost.

To be more precise, the present invention concerns an automobile vehicle which has a suspended chassis and means for supporting a mobile assembly. The vehicle is adapted to accommodate a shooting operator, a shooting device support and a shooting device wherein the support enables simultaneous pendular movement of the mobile assembly in two substantially orthogonal directions in a plane parallel to that of the chassis and pivoting about a vertical axis independent of the position of the chassis.

The plane of the first two directions is advantageously near and above the center of gravity of the mobile assembly.

The height varying means advantageously have a range of movement between a high position and a low position, the operator standing in the high position and kneeling in the low position, the feet of the operator remaining in contact with the vehicle.

The height varying means are preferably controlled by the shooting operator.

The features and advantages of the present invention will emerge in more detail in the following description of two embodiments of the invention given by way of non-limiting example with reference to the appended drawings.

BRIEF DESCRIPTION OF THE DRAWINGS

FIG. 2b is a view in lateral elevation of a first embodiment of a vehicle in accordance with the invention in a position different from that shown in FIG. 2a;

FIG. 3b is a plan view of a first embodiment of a vehicle in accordance with the invention in a position different from that shown in FIG. 3a;

FIG. 3c is a simplified plan view of a part of a first embodiment of a vehicle in accordance with the invention in a position different from those shown in FIGS. 3a and 3b but corresponding to the position shown in FIG. 4a;

FIG. 4b a rear elevational view of a first embodiment of a vehicle in accordances with the invention in a position different from that shown in FIG. 4a;

DETAILED DESCRIPTION OF THE PREFERRED EMBODIMENT

Figure 1A:
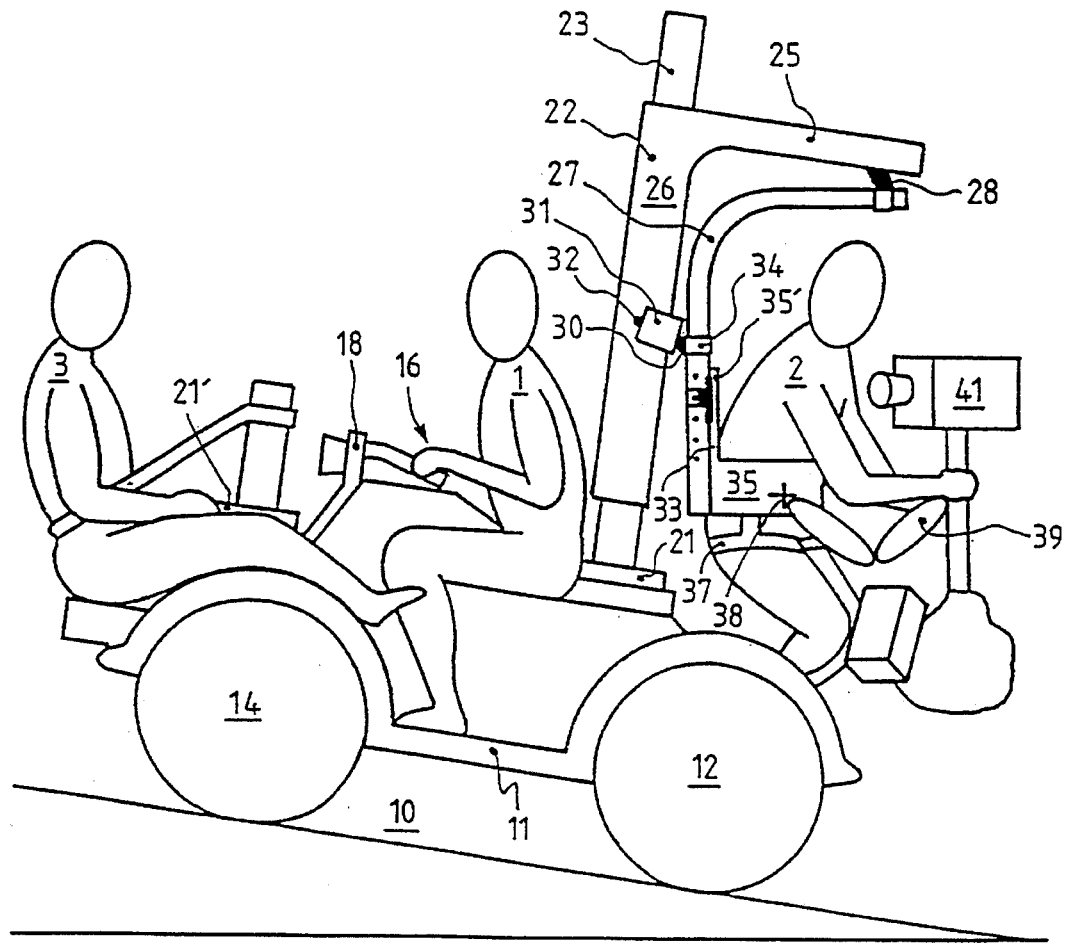
FIG. 1*a* is a view in lateral elevation of a first embodiment of a vehicle in accordance with the invention.

A first embodiment of the invention will be described with reference to FIGS. 1 through 4b, which show a vehicle 10 embodying a chassis 11, two rear wheels 12 and 13 and two front wheel 14 and 15.

A four-wheel vehicle is used in both embodiments and described by way of example but it is equally feasible to use any other type of terrestrial, amphibious, maritime or air cushion vehicle without departing from the scope of the invention.

The chassis 11 is connected to the four wheels 12 through 15 by conventional suspension means (not shown). The suspension means advantageously offer an all-terrain capability. The vehicle 10 is conventionally equipped with a motor (not shown), a driving position 16 for a driver 1, steering means 18 operating through the front wheels 14 and 15 and conventional accelerator, brake, clutch and gear change means (not shown).

A base 21 attached to the chassis at the rear of the vehicle 10 slightly forward of the rear wheels 12 and 13 is adapted to receive an elevator post 22 having a fixed part 23 connected to the base 21 and a sliding part 24 which fits over the top of the fixed part 23. In the case of a round cross section sliding post 22, as shown in the figures, a guide device (not shown) preventing relative pivoting of these members must be provided but this is not necessary with rectangular cross section sliding posts which could equally well be used.

In a variant that is not shown, the elevator post 22 could embody a fixed base and an upper part joined together by one or more hydraulic jacks.

The elevator post 22 is normal to the chassis 11 but in a variant that is not shown could be at an angle of slightly less than 90° to the chassis 11 so that the top of the elevator post 22 is closer to the center of the vehicle 10 than the base 21.

The sliding part 24 of the elevator post 22 may be raised relative to the fixed part 23 by a sliding movement of limited travel. The sliding movement is imparted by conventional means (not shown). These may be electromechanical in nature, for example, (chain or rack driven) or pneumatic or hydraulic. In practice, any type of elevator post may be suitable.

At the top of the sliding elevator post 22 is a boom 25 projecting normally to the sliding axis of the post 22. The boom 25 is substantially aligned with the direction in which the vehicle 10 moves.

The assembly including the elevator post 22 and the boom 25 forms a gibbet 26 adapted to be raised and lowered (FIGS. 1a, 1b, 2a and 2b) within vertical amplitude limits defined by the sliding of the elevator post 22.

Means (not shown) are provided for raising and lowering the elevator post 22. Manual control is advantageously provided, for example by means of a handle with a trigger connected by a cable to a fixed control device, the handle being preferably attached to a support 39 of a shooting device 41.

A sub-gibbet 27 constituted by a cranked tube in the embodiment shown is connected to the gibbet 26 by two SILENTBLOC mounts 28 and 30.

Figure 3A:
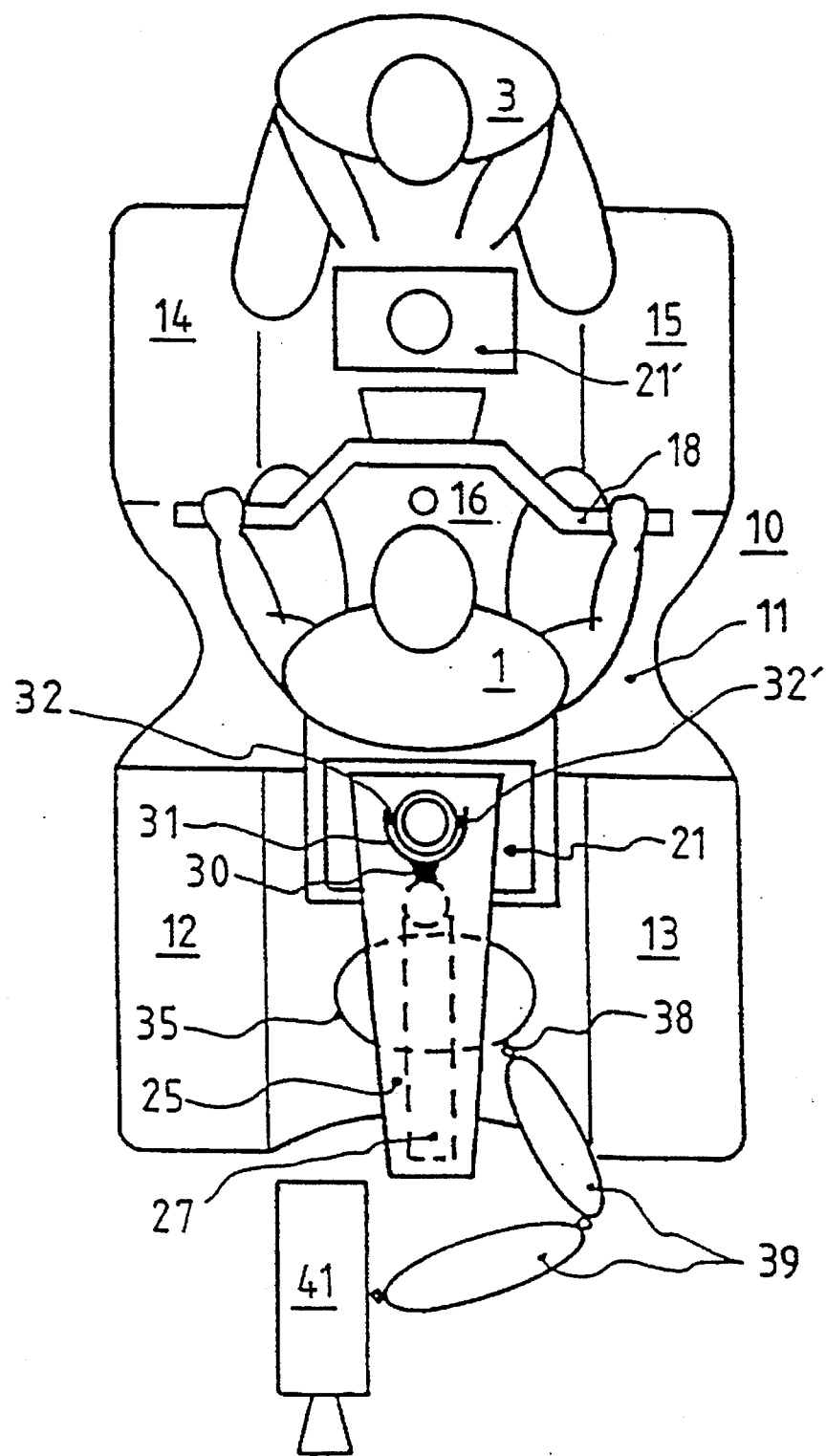
FIG. 3a is a plan view of a first embodiment of a vehicle in accordance with the invention.
Figure 3:
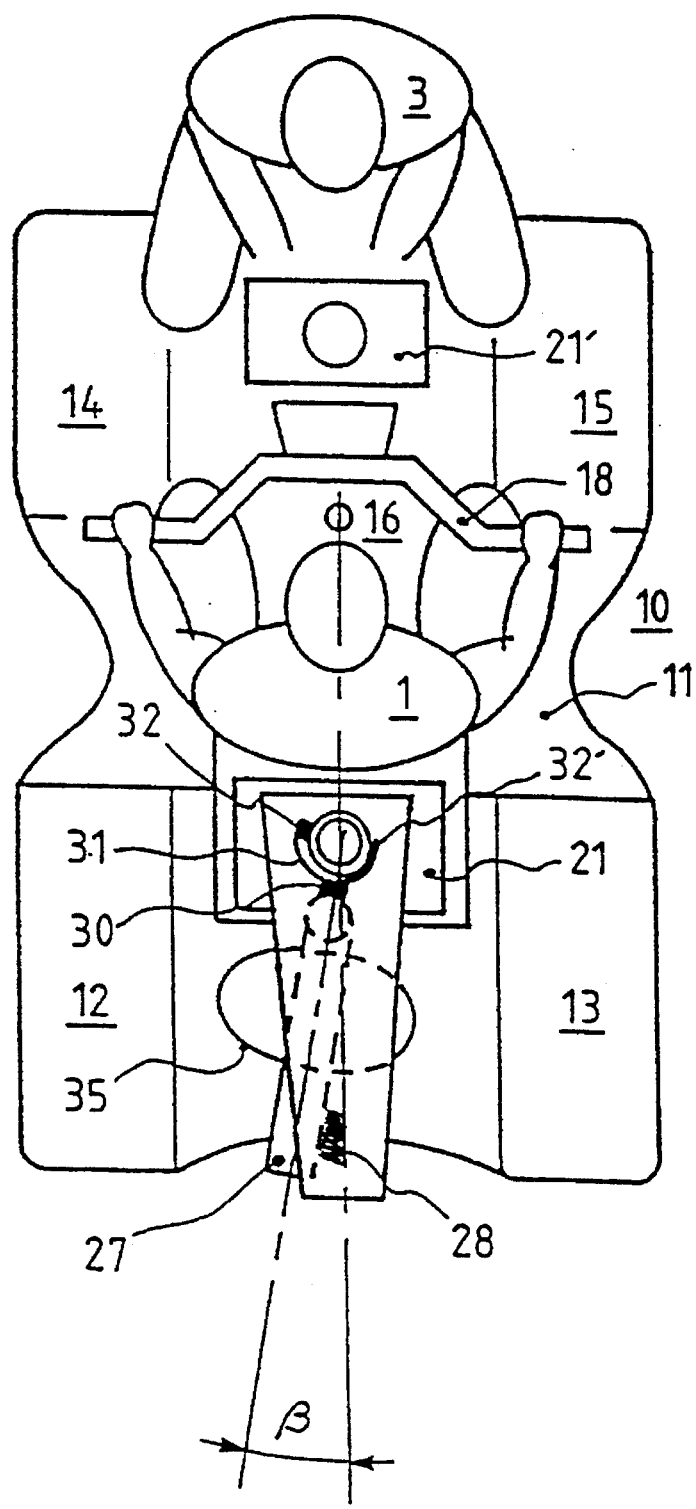

The mount 28 connects the upper part of the sub-gibbet 27 (which is an inverted L-shape) to the underside of the boom 25. The second mount 30 joins the lower part of the sub-gibbet 27, which is at a right angle to the upper part, to an intermediate bracket 31 connected by two SILENTBLOC mounts 32 and 32' to the sliding part 24 of the elevator post 22. The two mounts 32 and 32' are in face-to-face relationship on respective opposite sides of the sliding elevator post 22 in a plane normal to the boom 25, as can be seen in plan view in FIGS. 3a through 3c. In a variant that is not shown a device of this kind may be substituted for the mount 28 on the boom 25. For increased safety in the event of failure of an attachment, the intermediate bracket 31 may be replaced by a ring (not shown) entirely surrounding the boom 25 and having on its inside surface at least a pair of SILENTBLOC mounts (not shown) disposed in exactly the same way as the mounts 32 and 32'.

One skilled in the art will select the hardness and the internal damping coefficient of the SILENTBLOC mounts already mentioned so that the mount 28 is able to carry the sub-gibbet 27 with a limited range of angular deviation relative to the boom 25. Similar selections will apply to the mounts 30, 32 and 32' which have to retain the sub-gibbet 27 with a few degrees of freedom relative to the elevator post 22. Without departing from the scope of the invention, the mount 28 may be duplicated along the boom 25 for increased support at the cost of restricting possible movement of the sub-gibbet 27. On the other hand, if it is desired to increase the possible relative displacement and angular deviation of the sub-gibbet 27 relative to the boom 25, the mount 28 could be replaced by a device similar to the combination of the intermediate bracket 31 and the mounts 30, 32 and 32'.

Any means of supporting the sub-gibbet 27 other than the SILENTBLOC mounts already mentioned is within the scope of the invention provided that it combines support for the sub-gibbet 27 and the weight suspended from it (see below) with a coupling providing any required degree of damping and sufficient elasticity to enable limited movement of the sub-gibbet 27 relative to the boom 25 and relative to the elevator post 22. This applies in particular to variable stiffness ball-joint couplings which offer some elasticity due to the structure of their material, and variable compression spring/damper combinations.

Figure 1B:
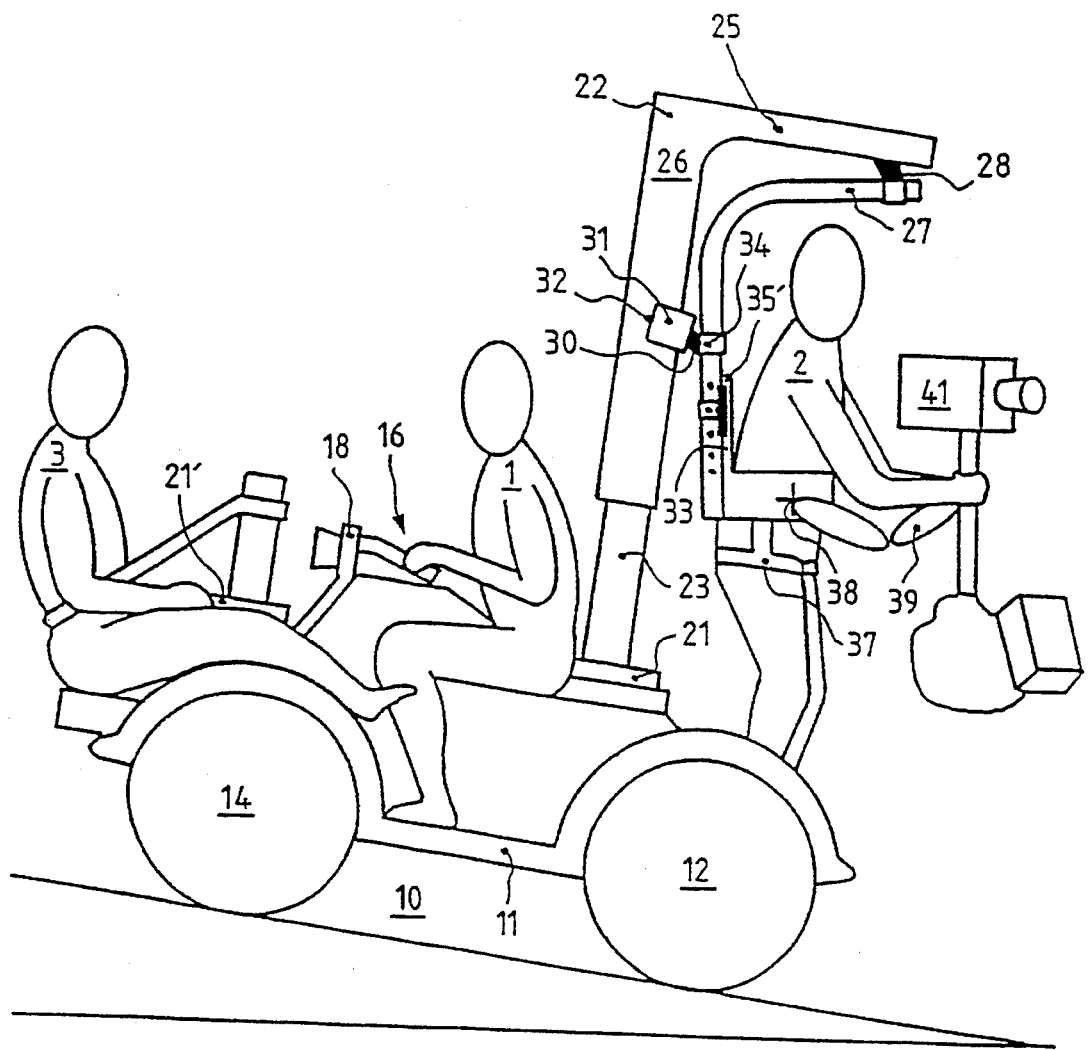
FIG. 1b is a view in lateral elevation of a first embodiment of a vehicle in accordance with the invention in a position different from that shown in FIG. 1.

A harness 33 is attached to the sub-gibbet 27 to be worn by an operator 2 with his back to the sliding elevator post 22. Thus the operator normally faces towards the rear of the vehicle, as shown in FIGS. 1a and 1b.

In an optional variant shown in FIGS. 2a through 3b a station for a shooting assistant 3 is provided at the front of the vehicle 10.

Figure 2A:
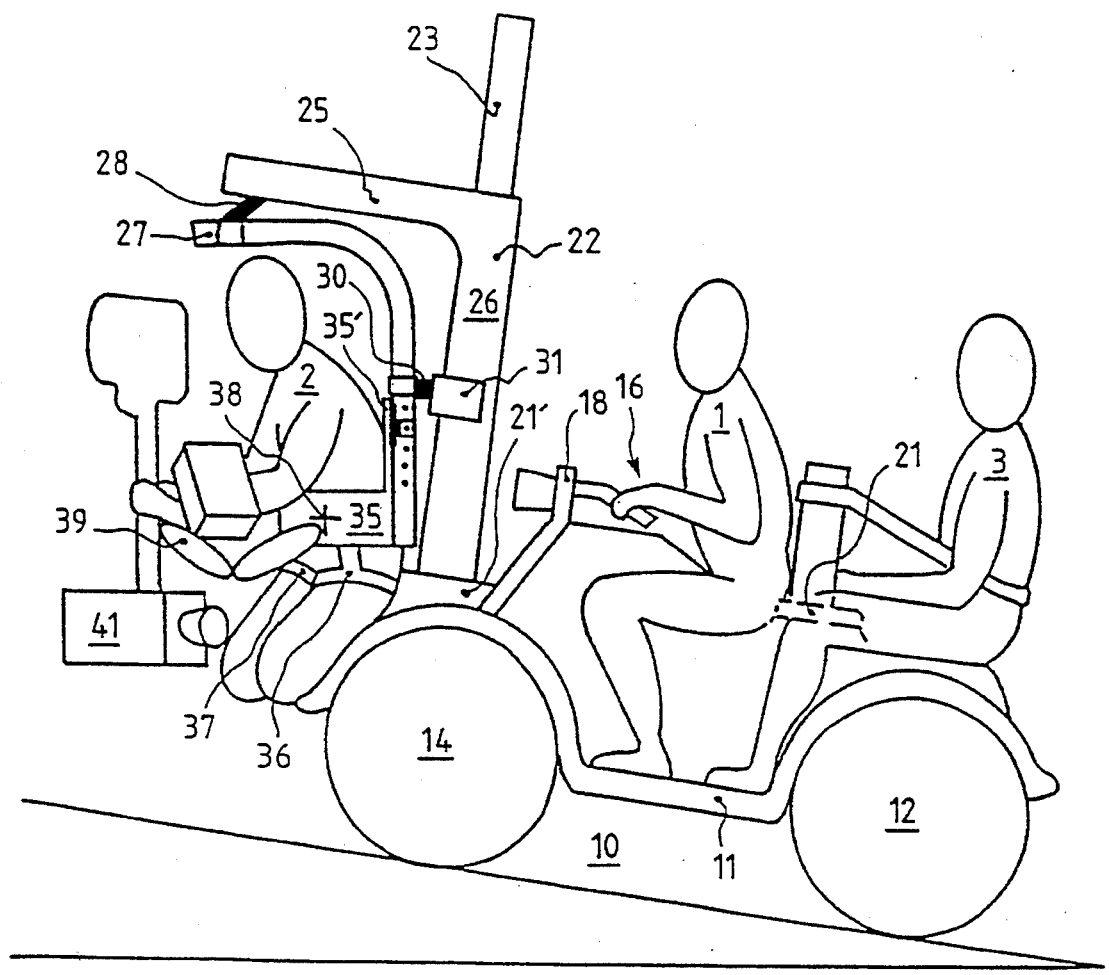
FIG. 2a is a view in lateral elevation of a first embodiment of a vehicle in accordance with the invention in a configuration different from that shown in FIGS. 1a and 1b.
Figure 2B:
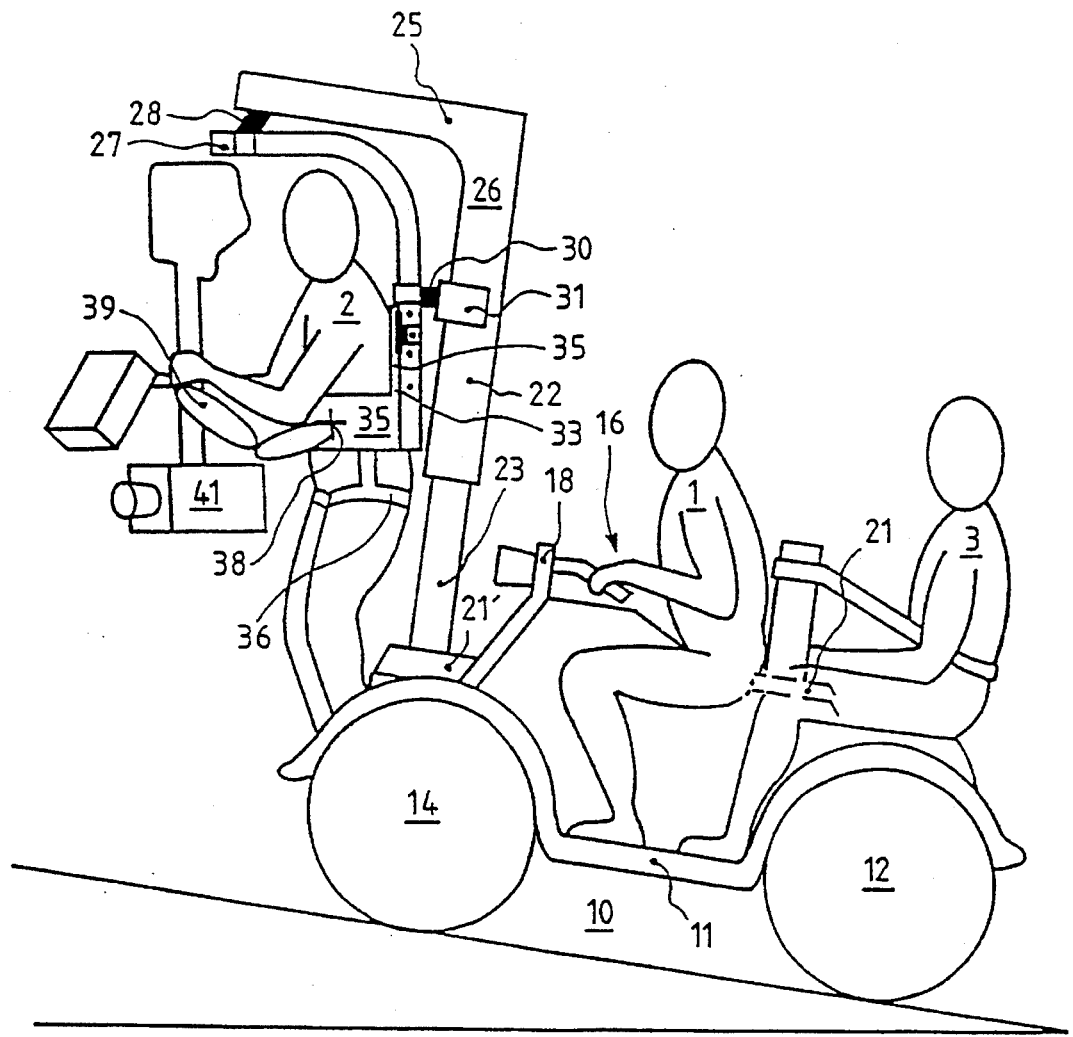

A second base 21' adapted to receive the elevator post 22 is situated in front of the driver position 16 and aligned with the base 21 in the direction in which the vehicle 10 moves. When the post 22 is fixed to the base 21' the operator 2 is at the front of the vehicle 10 with his back to the elevator post 22 and normally faces towards the front of the vehicle. The station for the assistant 3 is then switched to the rear of the vehicle 10, on the opposite side of the driver 1 (FIGS. 2a and 2b).

The harness 33 is a rigid belt 35 extended at the rear by an upwardly directed back member 35' which connects in this first embodiment of the invention to the vertical part of the sub-gibbet 27 through stiff hinge means 34 whose fixed part is in the form of a collar on the sub-gibbet 27 and whose pivot axis is parallel to its vertical part and as close to the latter as possible. Use may be made either of a simple hinge braked by a screw (or any other known device) sufficiently long to provide a coupling without risk of torsion along the back member 35' or, and preferably, partially elastic means such as a pair of vertically stacked SILENTBLOC mounts (20 cm apart, for example) or a single SILENTBLOC mount of sufficient length or any other means resisting and limiting rotation. The pivoting travel of the hinge means 34 described must allow rotation of the back member 35' (and thus of the harness 33 as a whole) over some 10°, which value may be further reduced by adjustable abutments (not shown).

It is important to provide different points for fixing the hinge means 34 (and thus the harness 33) along the vertical part of the sub-gibbet 27 under the mount 30 to enable adjustment of the degree of freedom of the sub-gibbet relative to the gibbet 26 by controlling the distance between loads supplied to the harness 33 and the mounts 28, 30, 32 and 32'. This enables operators of different heights and weights to adapt their working position to suit the shooting to be carried out.

On a part opposite the hinge means 34, the belt 35 has an attachment point 38 adapted to receive the shooting device support 39 and the shooting device 41.

The shooting device support 39 is advantageously an articulated arm incorporating at least one deformable parallelogram (not shown).

To be more precise, the shooting device support 39 includes at least one pair of arms pivoted together, means for rotational coupling of one end of the arms to a support, means for connecting the other end of the arms to a weight and spring means on each arm adapted to compensate the weight applied to the end of each arm. A shooting device support of this kind is well known to one skilled in the art and is marketed under the tradename "STEADYCAM". It is shown diagrammatically in FIGS. 1a and 2b and in part in FIGS. 4a and 4b to constitute a non-limiting example of the support 39 for the shooting device 41.

The attachment point 38 of the support 39 of the type shown by way of example in the figures must, to operate under ideal conditions, be on one of the ventral sides of a harness (not shown) provided for the cameraman (this harness is equivalent to the rigid belt 35), so that the support 39 moves in the area under either arm of the latter, constituting a double articulation enabling controlled floating support of the shooting device or camera 41. As the side chosen for the attachment point is immaterial to the invention, reference number 38 covers lateral attachment to the right of the trunk of the operator 2 (FIGS. 1a and 1b) or to the left (FIGS. 2a through 4b). The attachment positions shown are adopted solely for convenience in the drawings. It will be apparent to one skilled in the art that two pre-installed attachment points 38 may be provided or a symmetrical intermediate plate that can be fitted either way and constitute a single attachment point 38. Without departing from the scope of the invention, any other location on the belt may be used if a different type of support 39 is employed.

The chassis 11 and the superstructure of the vehicle 10 are preferably open where the knees of the operator 2 locate in the lowest position permitted by the sliding elevator post 22 so that the support 39 and the shooting device 41 can move freely.

Stirrups 29 and 29'0 (see FIGS. 5 and 6 which show a separate embodiment of the invention) for holding the ankles of the operator 2 advantageously connected to hinges that can be locked in any required position and disposed like starting-blocks are provided if the superstructure of the vehicle 10 does not offer any adequate attachment point. They are advantageously disposed slightly to the rear so that in the lowest camera position the knees of the operator 2 can dangle in space with no particular muscular effort.

The rigid belt 35 is adapted to fit the waist of the operator 2 and has conventional opening and closing means so that it can be put on quickly together with means (not shown) for adjusting its diameter. Two supporting straps 36 and 37 are provided for the operator 2 and allow accurate adjustment for his height within the rigid belt 35. The operator 2 can therefore choose whether to have the lower or middle part of his trunk in contact with the belt. The operator 2 is preferably strapped into the belt 35 by straps enabling full flexing of the legs and a balanced distribution of the weight of the body.

It is desirable to be able to partially control the various movements of the sub-gibbet 27 (permitted by the set of SILENTBLOC mounts already mentioned and exerted by the operator 2 according to the total weight supported by the harness 33) by adjusting the position of his body inside the rigid belt 35 by adjusting the straps 36 and 37 and also by keeping his feet in contact with the chassis 11 by means of the stirrups 29 and 29'.

The mobile assembly composed of the operator 2, the harness 33, the support 39 for the shooting device 41 and the shooting device 41 itself has a variable center of gravity (not shown). It is important for the SILENTBLOC mount 30 and the stiff hinge means 34 to be located over the highest horizontal plane defined by translatory movement of the center of gravity irrespective of the position in space of the shooting device 41. It is also desirable for the SILENTBLOC mount 28 to be as close as possible to a position vertically above the plane so defined.

The main elements characterizing the vehicle 10 in a first embodiment of the invention have been described. The operation of these elements will now be described with reference to FIGS. 1a through 4b.

The vehicle 10 shown is an automobile type vehicle and as described has four wheels 12 through 15. A driver 1 is seated at the driving position 16. When the vehicle 10 is moved by its motor the driver 1 uses the steering means 18, brake and accelerator means (not shown) and other conventional means such as a clutch and gearbox (not shown) if required.

The shooting operator 2 is installed in the harness 33 with the rigid belt 35 around his waist. When the gibbet 26 is in the low position (as in FIGS. 2a, 4a and 4b, for example) the operator 2 is virtually kneeling, although his weight is not resting on his knees as he is suspended from the harness 33. When the gibbet 26 is in the high position (it is close to this position in FIG. 1b) the harness 33 lifts the operator who is then standing, his feet remaining in contact with the chassis 11 through the stirrups 29 and 29' which hold his ankles. The sliding elevator post 22 which determines the position of the operator 2 is advantageously controlled by a handle within reach of the operator 2 and preferably attached to the support 39 for the shooting device.

Each of the SILENTBLOC mounts mentioned in the above description filters some of the impact and vibration to which the chassis 11 is subjected as the vehicle 10 moves over rough terrain.

The sub-gibbet 27 may move relative to the gibbet 26 within the limits of flexibility of the SILENTBLOC mounts by lateral or longitudinal translatory movement and/or angular deviation which changes their relative orientation.

The angle "β" in FIG. 3b shows the maximum possible angular deviation of the sub-gibbet 27 relative to the gibbet 26 (and therefore relative to the longitudinal axis of the chassis 11) in this first embodiment. The angle "β" is determined by the elasticity of the SILENTBLOC mounts 28 and 30, by their respective distances from the bend in the sub-gibbet 27 and by the elasticity of the pair of axially opposed SILENTBLOC mounts 32 and 32'.

Figure 3C:
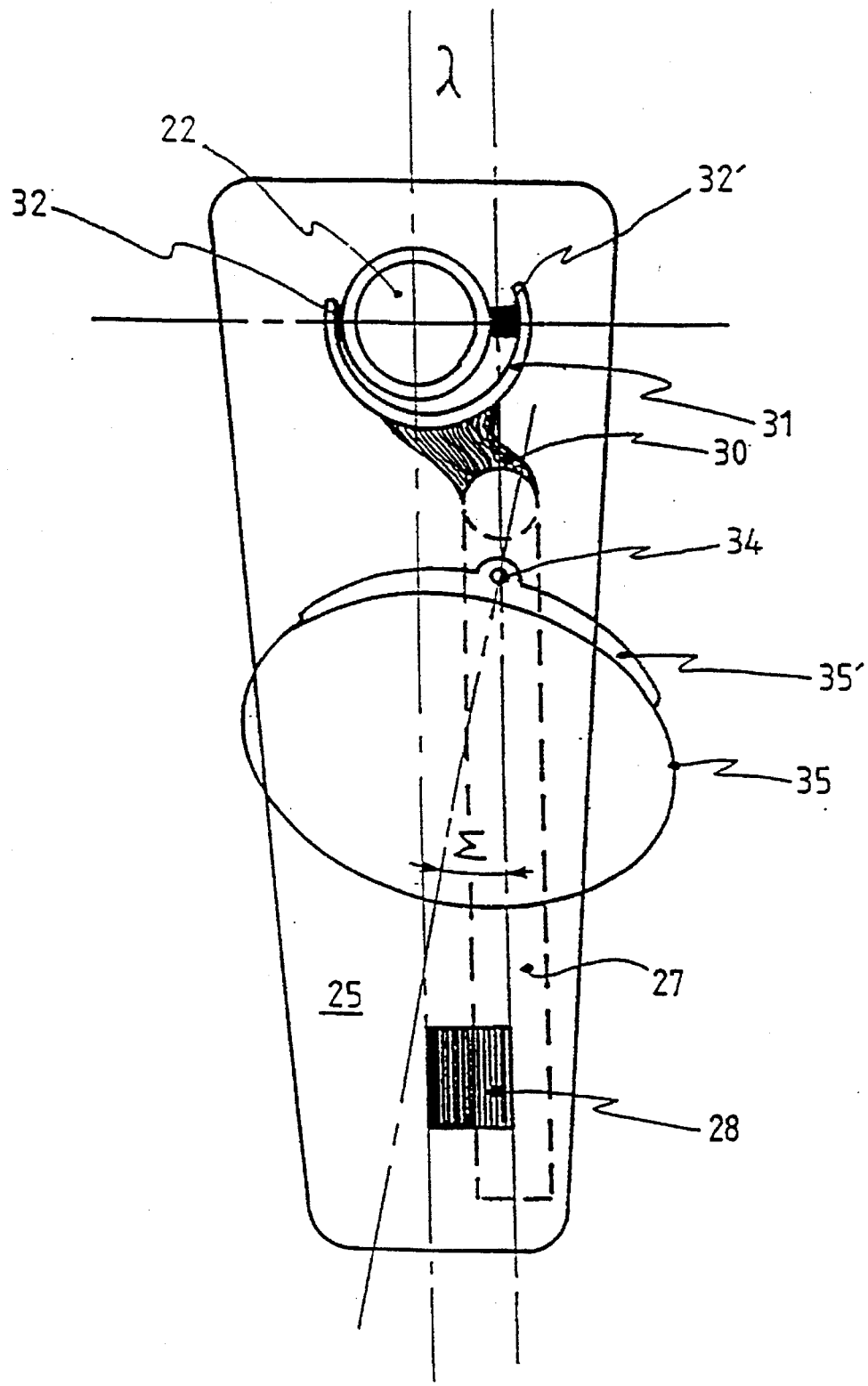

The angle "β" shown in FIG. 3b may in practice differ at the attachment point 38 as the attachment of the rigid belt 35 to the sub-gibbet 27 by the stiff hinge means 34 allows further angular deviation under the control of the operator 2 of the general direction of the mobile assembly relative to the plane defined by the sub-gibbet 27. FIG. 3c shows rotation through an angle "Σ" corresponding to the pivoting shown in FIG. 4a. This movement occurs in a plane normal to the descending part of the sub-gibbet 27, is braked and limited (by adjustable abutments that are not shown) and prevents any tilting of the operator 2 in the front/rear direction other than the pendular movement allowed by the SILENTBLOC mounts already described.

FIG. 3c also shows a maximum possible relative displacement "λ" of the same members in this first embodiment. This figure relates to a sideways tilt of the vehicle 10 as shown in FIG. 4a.

The maximum amplitude of the translation (whether lateral or longitudinal) depends on the gap between the gibbet 26 (made up of the boom and elevator post) and the sub-gibbet 27 and on the size and the coefficient of elasticity of the various SILENTBLOC mounts already mentioned. FIGS. 1a through 2b concern shooting on a sloping route and show examples of longitudinal translatory movement of the various means supporting the mobile assembly, in particular by retraction along the gibbet 26 of the intermediate bracket 31 or its movement in the opposite direction. The operator 2 does not have to deliberately compensate for these variations in gradient which would make use of the support 39 for the shooting device or camera 41 dangerous if the latter were fixed rigidly to the vehicle 10. The operator does not have to pull the support 39 back into its operating position using intense muscular effort which would compromise the quality of his work and make it dangerous and can, therefore, concentrate on shooting without paying attention to the terrain.

Figure 4A:
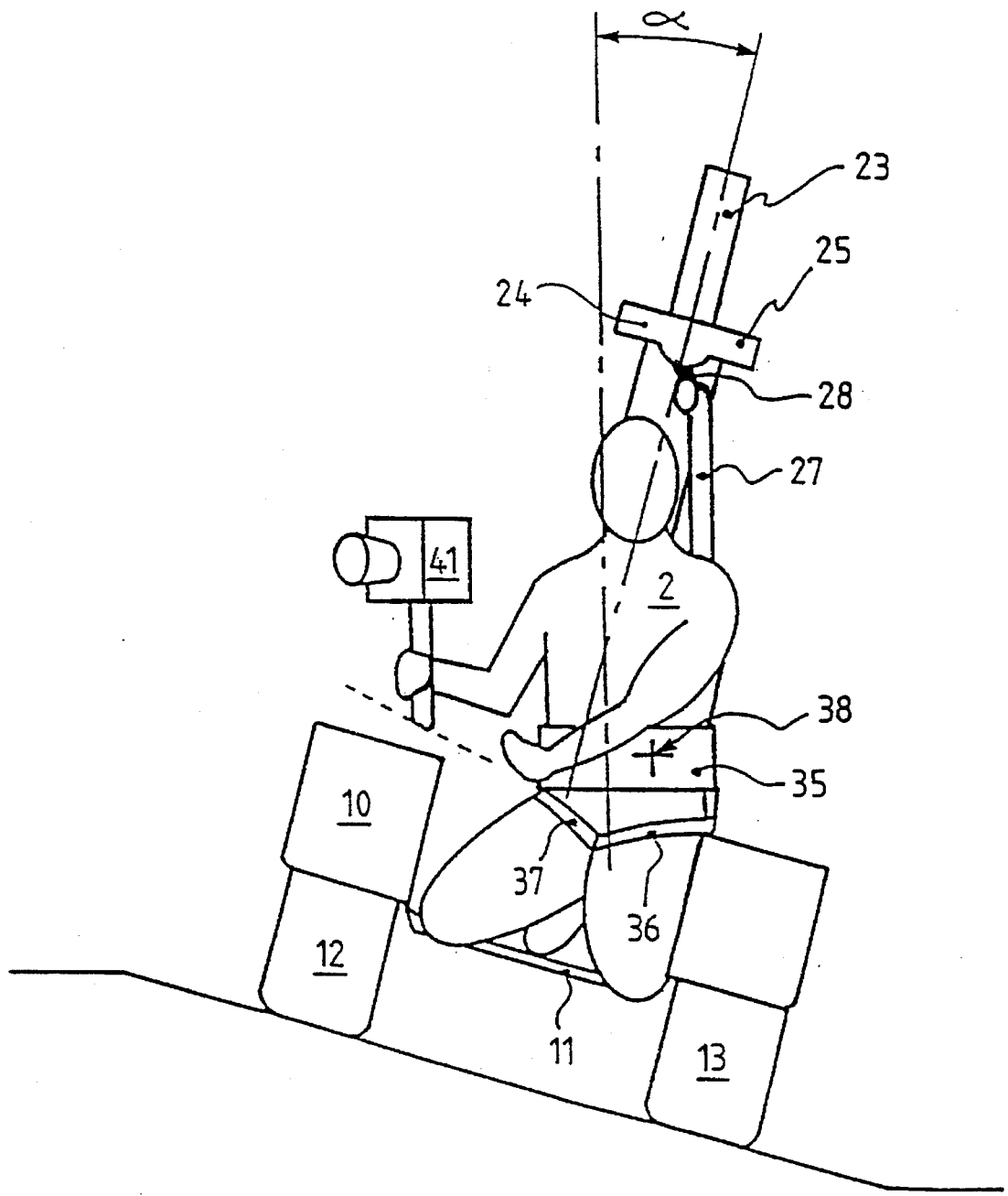
FIG. 4a is a perspective rear view of a first embodiment of a vehicle in accordance with the invention.
Figure 4B:
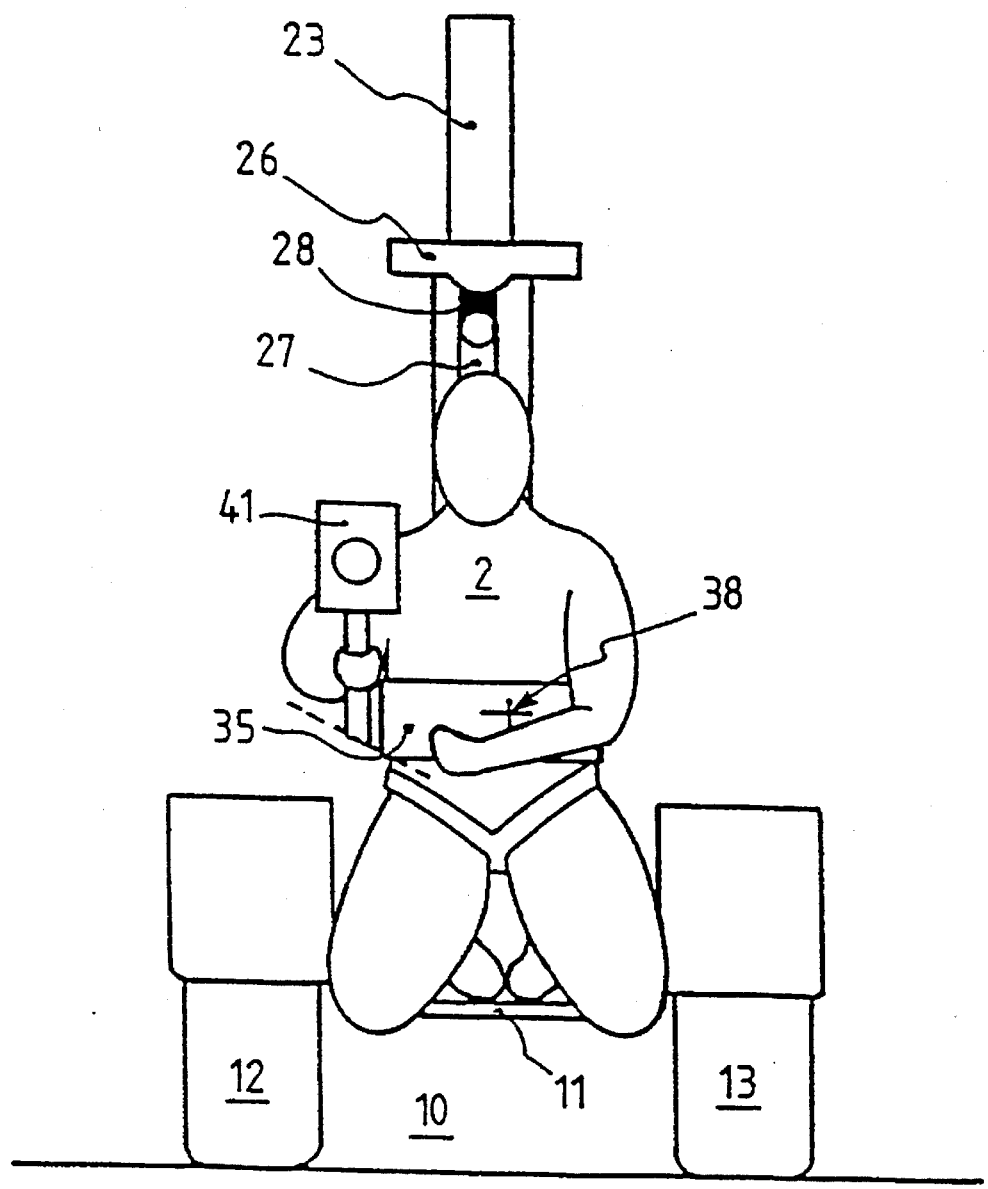

FIGS. 4a and 4b show two positions of the vehicle moving with a sideways tilt and on a level surface. In FIG. 4a the mobile assembly pivots around the boom 25 and tends to remain as close to the vertical as possible. The torsion of the SILENTBLOC mount 28 and the SILENTBLOC mounts 30, 32 and 32' (not visible) allows an angular deviation "α" between the axis normal to the plane of the belt 35 and the gibbet 26, allowing the mobile assembly to be virtually vertical. In this case, and in combination with the pendular movement to which he is himself subjected, the operator 2 instinctively flexes the leg on the downside of the slope to assist with levelling the mobile assembly whose center of gravity is substantially under the SILENTBLOC mount 28 (FIG. 4a). Whether the vehicle 10 is tilted to the front or the rear or to the side, depending on the terrain, such compensatory movements are facilitated by the fact that the sub-gibbet 27 is to some degree able to oscillate like a pendulum.

As the feet of the operator 2 remain in contact with the chassis 11 the operator senses the varying inclinations of the vehicle 10 dependent on the terrain it is travelling over, sudden acceleration or braking and tight turns. He can compensate such displacements away from the horizontal by moving his lower torso to push or pull on the rigid belt 35 or on the back member 35', by bracing his legs against the stirrups 29 and 29', by pressing with his calves against the sides of the superstructure of the vehicle 10 or by limited flexing of his legs and pressing his body against the support straps 36 and 37. By deliberately making small counteracting movements or by allowing himself to swing freely in the supporting harness 33 the operator 2 is able to counter any unplanned transfer of load causing a transient loss of stability of the attachment point 38 of the support 39 for the shooting device 41 which could seriously interfere with its operation.

Even partial recovery of the verticality of some of the onboard masses enables the use of a narrow vehicle with a smaller supporting polygon. This has known advantages for shooting, in particular, the possibility of offering the camera a wider field of view.

The mobile assembly is capable of a limited pendular movement so that it remains as close to the vertical as possible, angular pivoting movement relative to the direction of movement of the vehicle and upward or downward movement relative to the chassis.

The operator 2 controls pendular movements instinctively and without major effort using his legs which remain in contact with the chassis.

The angular pivoting movement (through the angle "Σ" shown in FIGS. 3c and 4a, for example) is commanded naturally by the operator 2 when he turns his lower torso towards the subject for shooting.

The vertical movement is controlled by the operator 2 using a control provided for this purpose.

The first embodiment of the invention has the further advantage of being easy to manufacture and consequently of low cost.

A second embodiment of the invention will now be described with reference to FIGS. 5 through 8. Elements common to both embodiments are identified by the same reference numeral.

Figure 5:
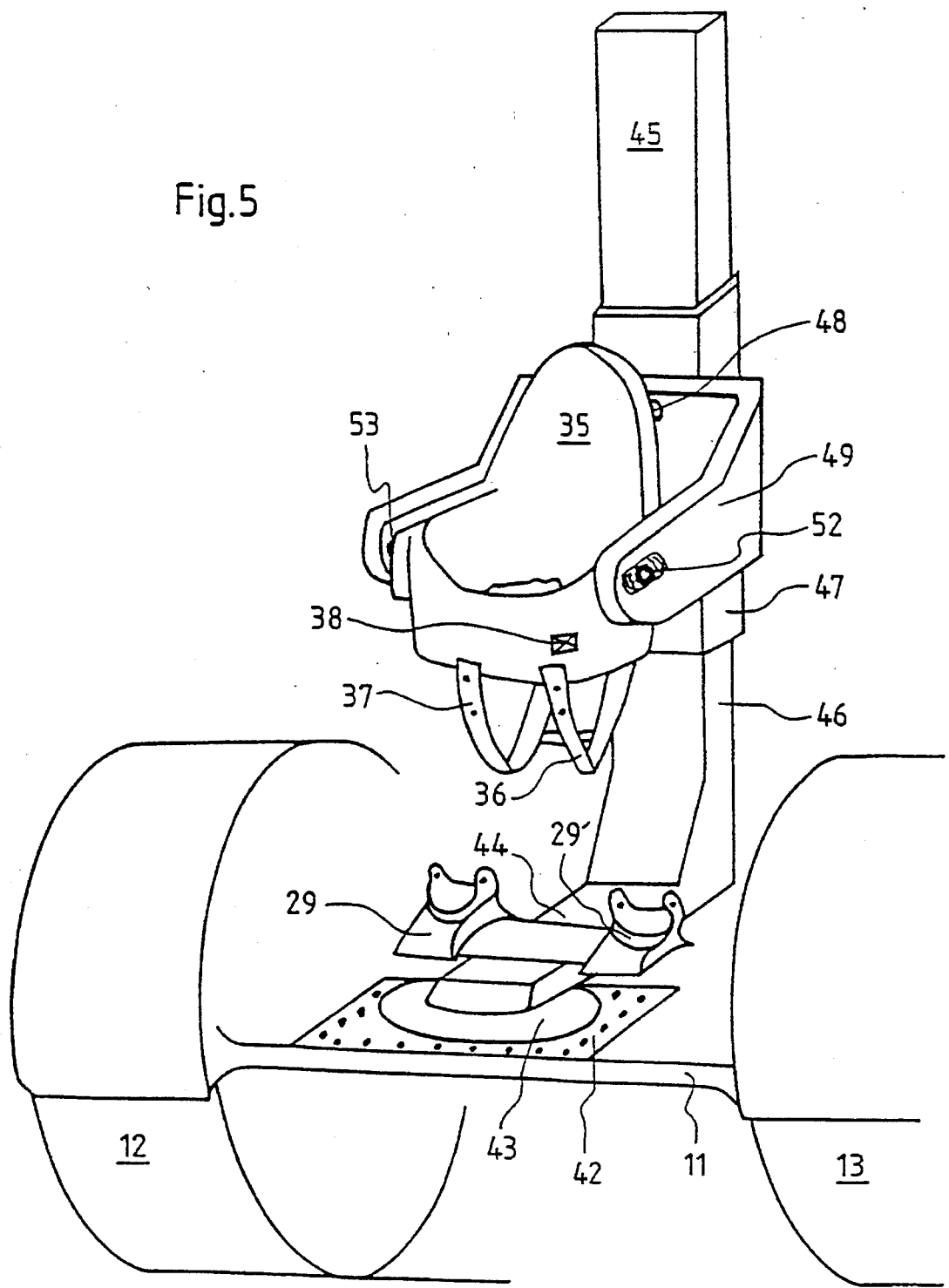
FIG. 5 is a partial perspective view of a second embodiment of a vehicle in accordance with the invention.

FIG. 5 is a partial perspective view of a vehicle which is a second embodiment of the invention. A base 42 including a turntable 43 providing a pivot is connected to the chassis 11.

A support arm 44 fixed rigidly to the turntable 43 projects radially thereof.

A sliding elevator post 45 is connected to the support arm 44 at the end opposite the turntable 43 and extends normally to the plane of the chassis 11. The sliding elevator post 45 has two parts, a reference member 46 connected to the support arm 44 and a greater transverse cross section sliding arm 47 which fits over the reference member 46. In the embodiment shown, the sliding elevator post 45 has a rectangular transverse cross section, however, the elevator post 45 may have any cross section without departing from the scope of the invention. If a sliding elevator post 45 of circular cross section is used, guide means must be provided to prevent pivoting of the sliding member relative to the reference member 46.

The axial travel of the sliding arm 47 relative to the reference member 46 is controlled by conventional electro-mechanical, electropneumatic, hydraulic or other means. These means are advantageously disposed inside the sliding elevator post 45 and are not shown in the figures.

The axial travel or movement of the sliding arm 47 is delimited by a maximum high position and a maximum low position explained later. The sliding arm 47 advantageously includes damper means adapted to filter vibration and impact on the chassis. This is conventional in the case of a hydraulic elevator arm.

A pivot 48 (FIGS. 5 and 6) at the top of the sliding arm 47 and normal to the sliding axis of the sliding arm 47 pivots on the sliding arm 47 to a yoke 49. The pivot 48 enables the yoke 49 to pivot about an axis parallel to the support arm 44. The yoke 49 has two cranked arms 50 and 51 extending from the pivot 48 in a plane parallel to the support arm 44 and in a direction opposite to the projection that the latter constitutes relative to the turntable 43. The arms 50 and 51 are cranked with a rounded corner in the embodiment shown. They may equally well be curved or have any other shape that one skilled in the art may find appropriate. The arms 50 and 51 each have a free end embodying a respective pivot 52 and 53 aligned with an axis normal to the axis of the pivot 48 so that the combination of the lifting arm 45 and the yoke 49 constitutes a gimbal.

Figure 6:
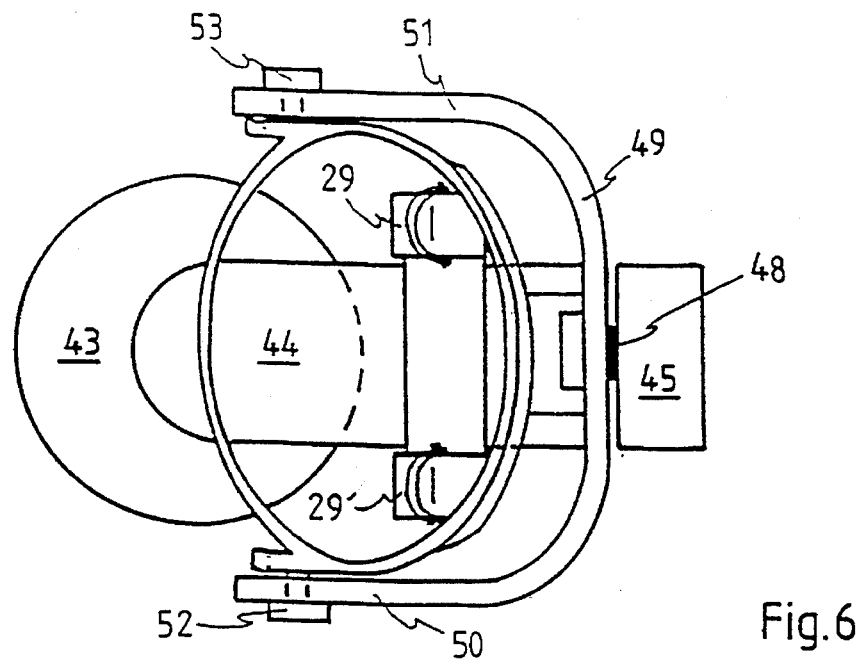
FIG. 6 is a partial plan view of a second embodiment of a vehicle in accordance with the invention.

As in the first embodiment of the present invention, the rigid belt 35 is fixed at the side to the two pivots 52 and 53. In FIGS. 5 and 6 the location on the belt 35 of the attachment point 38 for the shooting device support is schematically shown. The shooting device support 39 and the shooting device 41 are known in themselves and identical to those referred to above in the description of the first embodiment and are thus not shown in FIGS. 5 and 6. The support straps 36 and 37 form a harness for supporting the operator (not shown) with the belt 35 around his waist.

The disposition of the belt 35 and the yoke 49 is such that the axes of the pivots 52 and 53 are above the center of gravity of the mobile assembly (not shown) constituted by the operator, the shooting device support and the shooting device itself. This axis is as close as possible to a vertical line through the center of gravity. In practice the center of gravity varies with the weight of the operator and the position of the shooting device relative to the belt 35. If the axes of the pivots 52 and 53 are near and above the center of gravity of the mobile assembly variations in the position of the center of gravity have no significant effect on the working of the invention. However, it is important that the center of gravity is below the axes of the pivots 52 and 53 and also below the axis of the pivot 48.

The distance between the axes of the pivots 52, 53 and 48 is such that the pivot axis of the turntable 43 passes approximately through the center of gravity of the mobile assembly and allows sufficient clearance between the head and legs of the operator and the sliding elevator post 45.

The rotation axis of the turntable 43 preferably passes exactly through the center of gravity of the mobile assembly. As this varies in practice, a statistical average may be determined and the pivots 52 and 53 positioned accordingly.

In an economical implementation not well suited to shooting in rough terrain the turntable 43 may be free to rotate, being pivoted on a bearing. In this case the operator controls pivoting of the turntable directly with his legs, his feet resting on the chassis 11. To prevent unwanted rotation due to impact occurring as the vehicle travels over difficult terrain means may be provided for braking pivoting of the turntable 43.

The turntable 43 is preferably rotated using an electric motor (not shown), for example. The two stirrups 29 and 29' on the support arm 44 are identical to those described in connection with the first embodiment and attach the feet of the operator by means of ankle-straps. By virtue of their variable inclination, the stirrups offer a variable bearing and thrust point for reacting to the various tilts of the vehicle whether the operator is standing or kneeling as the limbs are not needed to rotate the turntable 43.

The turntable 43 may be rotated intentionally by the operator using a known control device.

Figure 7:
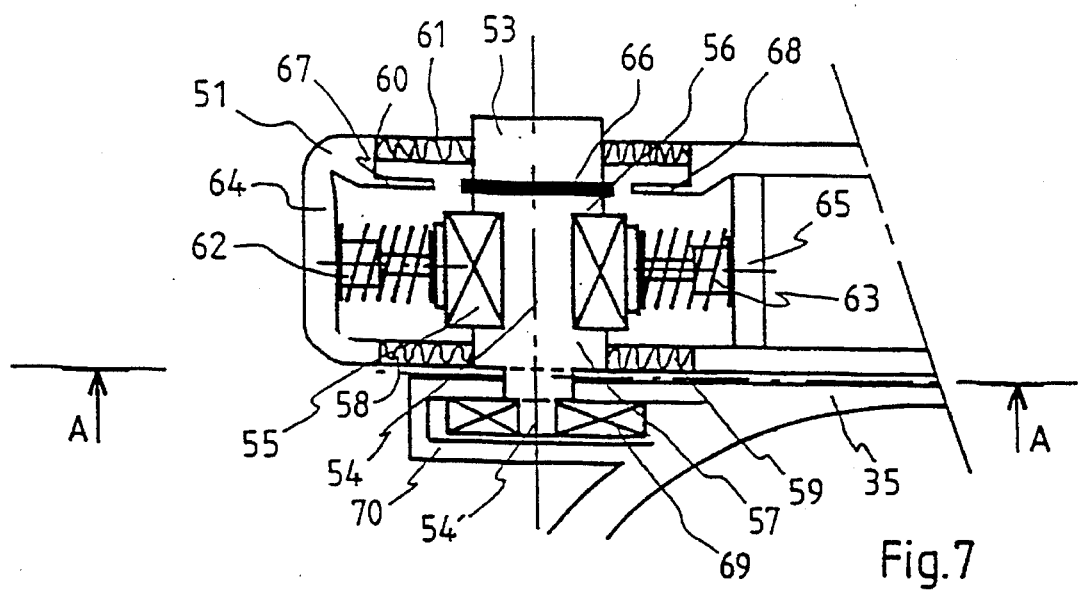
FIG. 7 is a plan view in cross section showing part of one variant of a second embodiment of the invention.

In a preferred variant of this embodiment of the invention the turntable 43 may be rotated in response to instinctive movements of the body of the operator 2. FIG. 7 shows in cross section one of the cranked arms 51 for this variant. The pivot 53 constitutes a main shaft 54 resting on a cylindrical bearing 55. The bearing 55 may be a thrust bearing, a ball bearing or a roller bearing. The main shaft 54 is delimited by two concentric disks 56 and 57, one at each end and serving as shims and support points.

Figure 8:
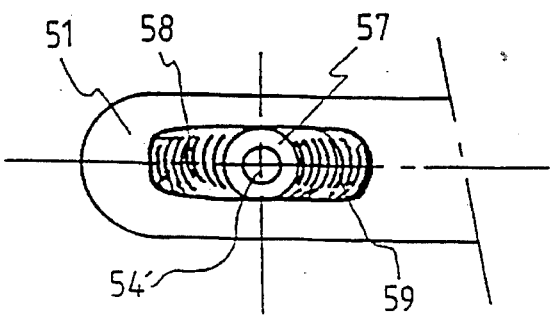
FIG. 8 is a partial elevational view taken along line A—A of the part shown in FIG. 7 of a variant of a second embodiment of the invention.

Referring to FIG. 8, the disk 57 is accommodated in an oblong notch 58 in the arm 51. Likewise the disk 56 is accommodated in an oblong notch 60 at the other end of the arm 51 (FIG. 7). The disks 56 and 57 can move in the notches 58 and 60 in the general direction of the arm 51. Flexible flanges 59 and 61 advantageously couple the notches 58 and 60 to the disks 56 and 57 to isolate the interior of the arm 51 from the exterior. This prevents soiling of the bearing 55 which is enclosed in two assemblies each embodying a concentric spring and damper 62 and 63, respectively. These two assemblies are diametrically opposed relative to the bearing and are aligned with the main axis of the arm 51. At the end opposite the bearing they are fixed to a respective abutment 64 and 65. The pivot 53 can therefore slide in a direction aligned with the main axis of the arm 51. This sliding movement is damped, however, constrained by the spring force and limited by the length of the notches 58 and 60.

A conductive material ring 66 connected to an electrical voltage is mounted coaxially with the pivot 53. Two conductive abutments 67 and 68 are provided on respective opposite sides of the ring 66 so that when the ring moving with the pivot contacts one of the abutments the electric voltage connected via one abutment or the other causes the turntable 43 to rotate in a respective direction.

In an alternate embodiment pressure sensors could be substituted for the conductive abutments 67 and 68. In this case the ring 66 does not need to be live and can be made from any mechanically appropriate material. The advantage of pressure sensors is their ability to supply a signal proportional to the mechanical pressure that they register. This makes it possible to control rotation of the turntable 43 with a speed proportional to the pressure applied. Piezo-electric type pressure sensors may be used, for example.

The main shaft 54 of the pivot 53 is extended towards the interior of the yoke 49 by an axial projection 54' extending beyond the concentric disc 57. The axial projection 54' incorporates a groove formed by a reduction in its diameter over part of its length. This groove is enclosed in a bearing 69 fastened by fixing means 70 to be rigid belt 35. The fixing means 70 constitute a projection rigidly connected to the belt 35 disposed so that the axis of the pivot 53 is positioned as required relative to the center of gravity of the mobile assembly.

Means may advantageously be provided for adjusting the relative position of the pivot 53 and the belt 35 so that operators of different height and weight can work under optimum conditions. The pivot 52, its arrangement on the arm 50 and the means of fixing it to the belt 35 are exactly the same as those described for the pivot 53 except that they are disposed symmetrically relative to the plane of the support arm 44 and the sliding elevator post 45.

The components of a second embodiment of the invention have been described above. This embodiment of the invention operates in the following manner (FIGS. 5 through 8).

The operator wearing the belt 35 is additionally supported by the straps 36 and 37, the belt and the straps forming a harness.

The pivots 52 and 53 above the center of gravity of the mobile assembly procure a pendular equilibrium tending to return the mobile assembly to the vertical in a front/back direction relative to the operator.

The pivot 48 which is also above the center of gravity of the mobile assembly imparts a pendular equilibrium tending to return the mobile assembly to the vertical in a sideways direction relative to the mobile assembly (relative to the operator).

The mobile assembly thus retains a substantially vertical position as the vehicle moves over non-horizontal ground. Also, the center of gravity of the vehicle is only slightly displaced by the pendular movement of the mobile assembly and this displacement tends to favor the stability of the vehicle.

The few deviations of the position of the mobile assembly relative to what the operator requires at the time can be rectified immediately and instinctively by the operator who keeps his feet in contact with the chassis 11 (via the turntable 43 and the support arm 44) due to his sense of balance.

Because the mobile assembly is able to pivot about an axis passing approximately through its center of gravity, when the vehicle makes a turn there is no significant centrifugal force tending to cause any such pivoting.

When the operator must shoot in a direction other than that in which the vehicle is moving he can rotate the turntable 43 in various ways, depending on the variant of the invention employed.

In a rudimentary first embodiment which is ill-suited to difficult terrain and which includes a small diameter freely rotatable turntable 43, the operator pushes on the chassis with his feet to turn the turntable 43.

In a second embodiment which includes a driven turntable the operator causes the turntable 43 to be rotated by means of a hand control (not shown), for example.

In the preferred third embodiment shown in part in FIGS. 7 and 8 the turntable 43 is large enough for the feet of the operator 2 to be attached to it.

When the operator turns instinctively towards a direction other than the direction aligned with the plane of the support arm 44 and the sliding elevator post 45 he turns his torso towards the required direction. In this case the belt 35 pivots slightly shifting the pivots 52 and 53 from their rest position. Referring to FIG. 7, the spring-damper assembly 62 and 63 is compressed and expanded or vice versa depending on the direction in which the belt 35 pivots. The ring 66 then comes into contact with the abutment 67 or 68 depending on the direction of pivoting, which rotates the turntable in the same direction, so pivoting the mobile assembly. When the operator has reached the required position he stops rotating his torso instinctively. The spring-damper assemblies 62 and 63 then return the pivots 52 and 53 to the rest position which isolates the ring 66 from the abutments 67 and 68 and so stops rotation of the turntable 43.

If the abutments 67 and 68 are pressure sensors the rotation of the turntable is more progressive, the effect of which is to avoid sudden pivoting of the mobile assembly.

The operator can select his elevation relative to the chassis 11 at any time using an appropriate control for the sliding elevator post 45, for example a hand control (not shown). As indicated already, the travel of the sliding elevator post 45 extends between a low position in which the knees of the operator are completely bent and a high position in which the legs of the operator are fully extended, although the operator's feet remain at all times in contact with the chassis 11 or with the turntable 43, depending on the embodiment chosen.

The two embodiments of the invention described have been described by way of non-limiting example only. It will be apparent to one skilled in the art that other embodiments are encompassed within the scope of the invention as defined by the claims.

What is claimed is:

1. A vehicle for transporting a camera operator comprising:
    a chassis;
    a mobile assembly mounted on said vehicle for receiving said camera operator, said mobile assembly having a vertical axis;
    means for supporting said mobile assembly in a plane parallel to said chassis, said support means providing pendular movement of said mobile assembly in two different, substantially horizontal directions; and
    means for pivoting said mobile assembly about said vertical axis independent of the horizontal attitude of said chassis.

2. The vehicle as set forth in claim 1 wherein said mobile assembly has, when taken together with said camera operator having a camera, a center of gravity located below said plane parallel to said chassis in which said mobile assembly is supported.

3. The vehicle as set forth in claim 1 wherein said mobile assembly support means comprises means for varying the height of said mobile assembly relative to said chassis of said vehicle, said height varying means being connected to said chassis.

4. The vehicle as set forth in claim 3 wherein said height varying means travels between a first position in which said operator is in a substantially standing position and a second position in which said operator is in a substantially kneeling position.

5. The vehicle as set forth in claim 1 wherein said mobile assembly support means comprises a damper means mounted between said mobile assembly and said chassis for reducing the impact and vibration transferred from said chassis to said mobile assembly.

6. The vehicle as set forth in claim 2 wherein said mobile assembly support means comprises:
a main gibbet connected to said chassis of said vehicle;
a sub-gibbet coupled to said main gibbet;
a harness hinged to said sub-gibbet above said center of gravity of said mobile assembly, said harness having a rigid belt adapted to receive said mobile assembly; and
means for damping located between said main gibbet and said sub-gibbet, said damping means enabling angular movement and lateral deviation movement of said sub-gibbet relative to said harness.

7. The vehicle as set forth in claim 1 wherein said mobile assembly support means comprises:
an elevator post connected to said chassis;
a gibbet slidably connected to said elevator post;
a gimbal connected to said gibbet; and
a harness connected to said gimbal for receiving said camera operator, said harness having a rigid belt.

8. The vehicle as set forth in claim 1 further comprising at least two bases spaced apart from each other and aligned with said chassis of said vehicle, said mobile assembly support means being connected to a first base of said at least two bases.

9. The vehicle as set forth in claim 1 further comprising:
means for continuously controlling said pivoting means, said control means being positioned to be used by said operator.

10. The vehicle as set forth in claim 1 further comprising:
means for continuously controlling said pivoting means mounted to said mobile assembly, said controlling means comprising sensors responsive to twisting of the torso of said camera operator.

11. The vehicle as set forth in claim 1 wherein said mobile assembly comprises:
a shooting device support mounted to said mobile assembly, said shooting device support further comprising:
an articulated arm defining at least one deformable parallelogram; and
a shooting device connected to and supported by said articulated arm.

12. The vehicle as set forth in claim 1 wherein said mobile assembly support means comprises:
at least one pair of arms connected to each other in spaced apart relationship to pivot together, each of said pair of arms having a first end and a second end;
a weight and spring means connected to said first end of each arm of said at least one pair of arms, said weight and spring means being adapted to compensate a weight applied to said first end of said one arm of said at least one pair of arms;
a coupling support located proximate said second end of each arm of said at least one pair of arms; and
means for rotationally coupling said second end of each arm of said at least one pair of arms to said coupling support, said rotational coupling means interposed said at least one pair of arms and said mobile assembly support means.

13. A vehicle for transporting a camera operator comprising:
a chassis mounted on suspension means, said chassis having a vertical axis;
a mobile assembly mounted about said chassis and comprising a camera, a support for said camera, and a harness for receiving said camera operator;
means for mounting said mobile assembly on said chassis, said mounting means comprising pivot means for pivoting said mobile assembly about said vertical axis; and
a hanging means for hanging said mobile assembly above a portion of said chassis, said hanging means allowing pendular movement of said mobile assembly in at least two different generally horizontal directions.

14. The vehicle of claim 13, wherein said vertical axis extends through said mobile assembly.

15. The vehicle of claim 13, wherein said mobile assembly has, when taken together with said camera operator, a center of gravity below the level of said hanging means.

16. The vehicle of claim 15, wherein said center of gravity substantially lies on said vertical axis.

17. The vehicle of claim 13, wherein said chassis further comprises a driving area for receiving a driving operator, said driving area including driving and steering means.

18. The vehicle of claim 13, wherein said mobile assembly further comprises means for varying the height of said mobile assembly relative to said chassis of said vehicle, said height varying means being connected to said chassis.

19. The vehicle of claim 18, wherein said height varying means travels between a first position in which said operator is in a substantially standing position and a second position in which said operator is in a substantially kneeling position.

20. The vehicle of claim 13, wherein said mounting means further comprises a generally vertical intermediate member, said hanging means being connected between said intermediate member and said mobile assembly.

21. The vehicle of claim 20, wherein said pivot means are connected between said chassis and said intermediate member.

22. The vehicle of claim 20, wherein said intermediate member includes an elevator post including a vertically moving part, said hanging means connected to said vertically moving part of said elevator post.

23. The vehicle of claim 21, wherein said intermediate member includes an elevator post including a vertically moving part to which said hanging means are connected.

24. The vehicle of claim 20, wherein said hanging means comprises a gimbal.

25. The vehicle of claim 21, wherein said generally vertical intermediate member comprises an L-shaped gibbet pivot means and a substantially horizontal arm portion connected to said pivot means and a substantially vertical arm portion extending substantially aligned with said vertical axis.

26. The vehicle of claim 13, wherein said harness comprises a rigid belt for surrounding the torso of the camera operator, said hanging means comprises a gimbal, said vehicle further comprising a sensing means connected between said gimbal and said rigid belt for sensing a twisting of the torso of said operator; and control means connected to said sensing means to control said pivot means in response to said operator's twisting.

27. The vehicle of claim 13, wherein said harness includes a rigid belt having a means for receiving said camera support connected to said rigid belt.

* * * * *